US008955667B1

(12) United States Patent
 Dibble

(10) Patent No.: US 8,955,667 B1
(45) Date of Patent: Feb. 17, 2015

(54) BULK MATERIAL HANDLING SYSTEM AND METHOD

(71) Applicant: Merton F. Dibble, Morganton, GA (US)

(72) Inventor: Merton F. Dibble, Morganton, GA (US)

(73) Assignee: Rail-Veyor Systems, Inc., Morganton, GA (US)

( * ) Notice: Subject to any disclaimer, the term of this patent is extended or adjusted under 35 U.S.C. 154(b) by 116 days.

(21) Appl. No.: 13/849,820

(22) Filed: Mar. 25, 2013

Related U.S. Application Data

(63) Continuation-in-part of application No. 13/571,239, filed on Aug. 9, 2012, now abandoned.

(60) Provisional application No. 61/521,559, filed on Aug. 9, 2011.

(51) Int. Cl.
 *B65G 15/26* (2006.01)
 *B65G 67/60* (2006.01)

(52) U.S. Cl.
 CPC ................................. *B65G 67/606* (2013.01)
 USPC ...... 198/594; 198/812; 414/139.4; 414/141.6

(58) Field of Classification Search
 USPC .................... 198/588, 594, 812, 312, 313; 414/139.1, 139.4, 141.4, 141.6, 139.3, 414/140.2, 140.4, 140.9
 See application file for complete search history.

(56) References Cited

U.S. PATENT DOCUMENTS

| 4,082,181 | A | * | 4/1978 | Berthold et al. | 198/861.4 |
| 5,193,965 | A | * | 3/1993 | Soros | 414/140.9 |
| 5,501,563 | A | * | 3/1996 | Grathoff | 414/137.1 |
| 5,871,324 | A | * | 2/1999 | Horak | 414/140.9 |
| 6,132,156 | A | * | 10/2000 | Shehata | 414/140.9 |
| 6,340,278 | B1 | * | 1/2002 | Takeda | 414/140.9 |
| 6,530,492 | B2 | * | 3/2003 | Weis | 212/316 |
| 7,909,153 | B2 | * | 3/2011 | Pogue | 198/315 |

* cited by examiner

*Primary Examiner* — James R Bidwell
(74) *Attorney, Agent, or Firm* — Allen, Dyer, Doppelt, Milbrath & Gilchrist

(57) ABSTRACT

A bulk material handling system and method use a horizontal boom frame supporting a conveyor mechanism for bulk material that is slidable relative to the horizontal boom frame. The conveyor mechanism is positioned such that, with bulk material received at a fixed location, or loading axis, on the horizontal boom frame, a portion of the conveyor mechanism will always be positioned to receive bulk material. The horizontal boom frame can also be made rotatable about the loading axis. By rotating the horizontal boom frame and advancing or withdrawing the conveyor mechanism, the discharge point for bulk materials relative to the loading axis can be altered radially and angularly without interrupting the flow of bulk materials through the system. A supply bridge assembly can be employed to bring the bulk materials to the loading axis of the boom.

21 Claims, 6 Drawing Sheets

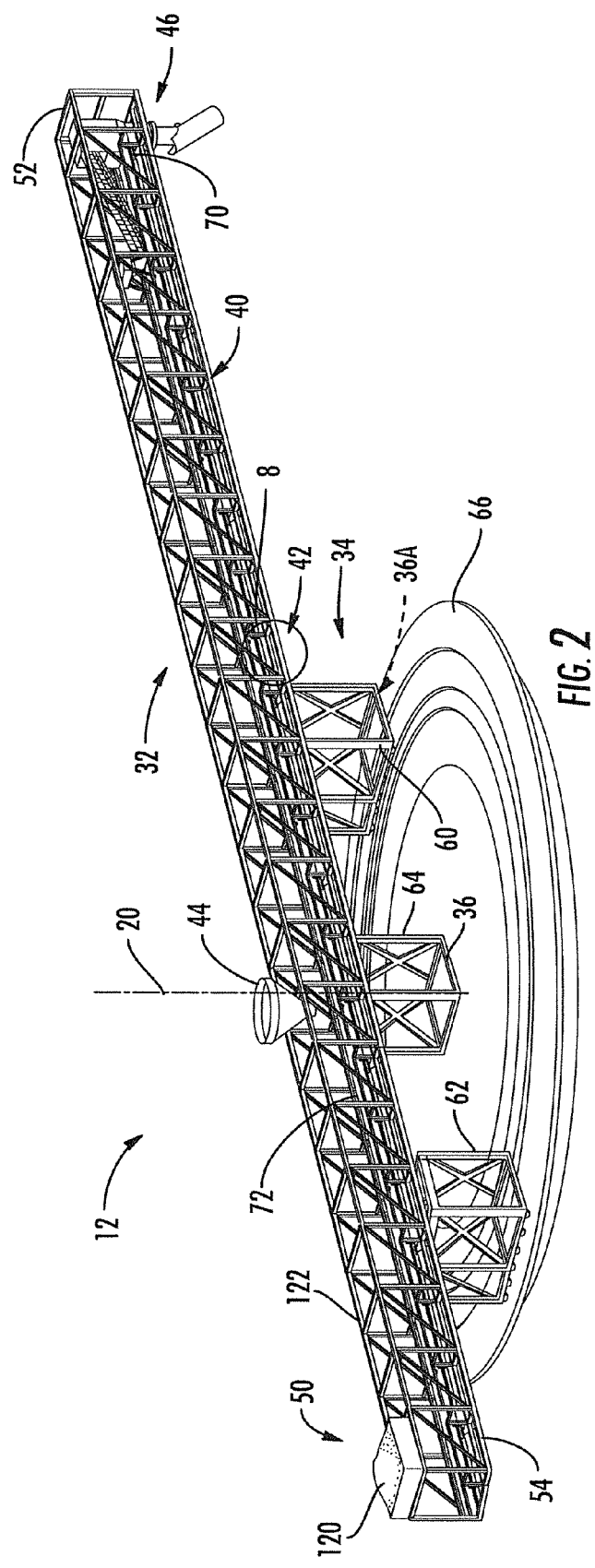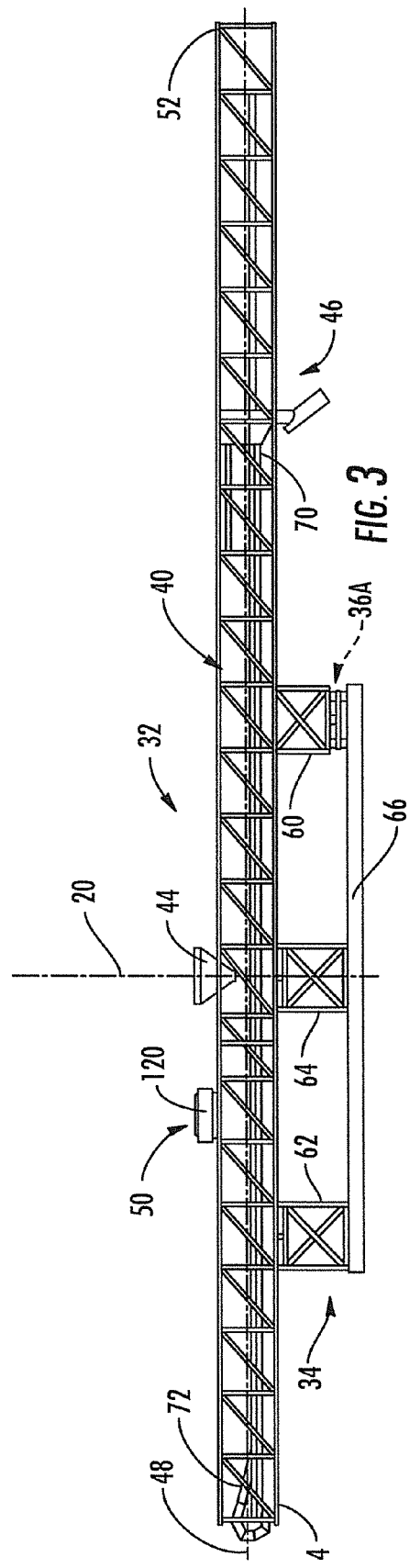

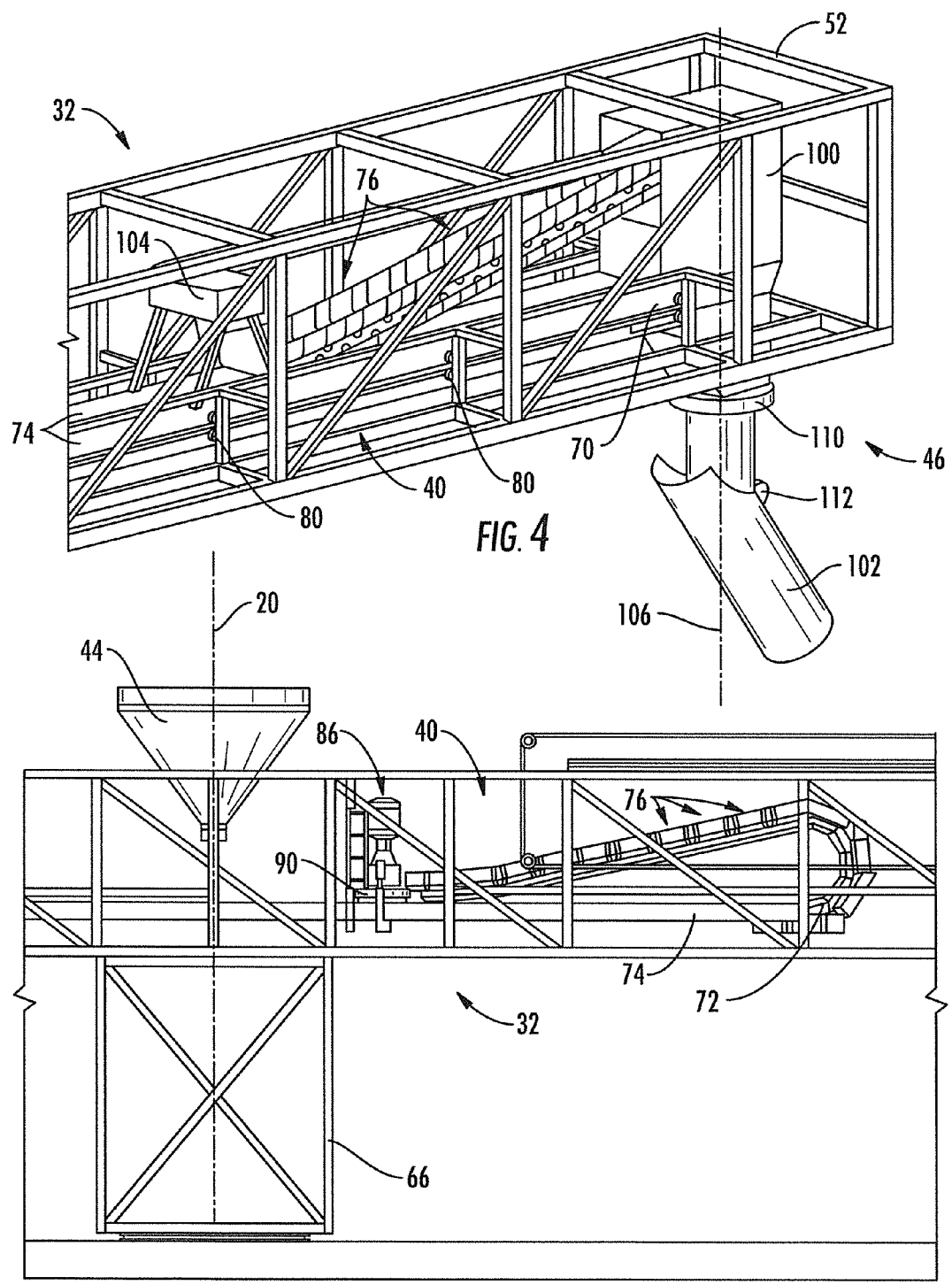

BULK MATERIAL HANDLING SYSTEM AND METHOD

CROSS-REFERENCE TO RELATED APPLICATIONS

This application is a continuation-in-part of U.S. Non-Provisional patent application Ser. No. 13/571,239, filed on Aug. 9, 2012, which claims the benefit of U.S. Provisional Patent Application Ser. No. 61/521,559, filed on Aug. 9, 2011, the contents of which applications are herein incorporated by reference in their entirety.

FIELD OF THE INVENTION

The present invention relates to the handling of bulk materials, and more particularly, to the systems and methods for loading bulk materials from a supply point onto ships or other transports.

BACKGROUND OF THE INVENTION

Given that the majority of bulk materials are usually not generated where they are to be employed, it is necessary to load bulk materials onto various transports to take them to their ultimate locations for use. For example, coal, metal ore and the like will often be mined in relatively remote locations and then loaded onto ships or barges for transport to industrial centers. The handling of bulk materials in such situations, and particularly at the rates and volumes demanded by modern industry, presents many challenges.

For example, when loading a ship or barge, it frequently necessary to move the vessel during the loading process in order to desirably distribute the bulk material at selected locations—which movements can result in an interruption of the loading process. A separate, but related, problem is getting the bulk material from a common supply point to the equipment used for loading a particular ship or ships—which often involves transport over a considerable distance.

By way of example, well known ship loading systems are described with reference to U.S. Pat. No. 5,501,563 to Grathoff for a Bulk Material Loading and Unloading Facility for Sea-Going Ships; U.S. Pat. No. 5,871,324 to Horak for Shiploader System; and U.S. Pat. No. 6,132,156 to Shehata for Ecological Shiploader, the contents of which patents are herein incorporated by reference in their entirety. Even with such well known bulk material handling equipment and conveying systems, further developments are possible.

SUMMARY OF THE INVENTION

In view of the foregoing, it is an object of the present invention to provide improved bulk material handling systems and methods. According to an embodiment of the present invention, a bulk material handling system includes a first loading boom assembly. The first loading boom assembly has a horizontal boom frame extending along a boom axis between first and second boom frame ends and a vertical boom frame supporting the horizontal boom frame between the first and second boom frame ends. A boom frame rotation mechanism engages the vertical boom frame and is operable to rotate the vertical and horizontal boom frames about a vertically-extending boom rotation axis intersecting the boom axis between the first and second boom frame ends. A boom conveyor mechanism is operable to convey bulk material therealong, and extends between first and second boom conveyor ends. The boom conveyor mechanism is slidably mounted to the horizontal boom frame extending along the boom axis and intersecting the rotation axis. The first boom conveyor end is oriented toward the first boom frame end and the second boom conveyor end is oriented toward the second boom frame end. A boom conveyor displacement mechanism engages the boom conveyor mechanism and is operable to slide the boom conveyor mechanism along the boom axis in a first boom direction, where the first and second boom conveyor ends move, respectively, away from and toward the rotation axis, and a second boom direction opposite thereto. A receiving hopper is mounted to the horizontal boom frame over the boom conveyor mechanism. The receiving hopper extends along the rotation axis and is configured to receive bulk material and subsequently direct bulk material to the boom conveyor mechanism. A discharge spout is arranged at the first end of the boom conveyor and slidable therewith, and configured to receive bulk material from the boom conveyor and subsequently discharge bulk material.

According to an aspect of the present invention the bulk material handling system also includes a loading boom supply bridge assembly. The supply bridge assembly has an elevated bridge frame extending over the first loading boom assembly along a bridge axis intersecting the rotation axis of the first loading boom assembly. A first bridge discharge chute is connected to the elevated bridge frame over the receiving hopper of the first loading boom assembly and operable to discharge bulk material thereinto. A first bridge conveyor mechanism extends along the elevated bridge frame to the first bridge discharge chute and is operable to convey bulk material from a supply point to the first bridge discharge chute.

According to another aspect of the present invention, the bulk material system can include one or more additional loading boom assemblies adjacent to the first loading boom assembly and supplied by one or more additional bridge conveyor mechanisms. The additional bridge conveyor mechanism(s) can extend across the same loading boom supply bridge assembly, or separate supply bridge assemblies.

These and other objects, aspects and advantages of the present invention will be better appreciated in view of the drawings and following detailed description of preferred embodiments.

BRIEF DESCRIPTION OF THE DRAWINGS

FIG. 2 is a perspective view of an exemplary one of the loading boom assemblies of FIG. 1, including a boom conveyor mechanism fully advanced in a first direction;

FIG. 3 is a side view of the loading boom assembly of FIG. 2, with the boom conveyor mechanism fully withdrawn in a second direction;

FIG. 4 is a detailed perspective view of a first end of the boom conveyor mechanism of FIG. 2;

FIG. 5 is a detailed side view of a second end of the boom conveyor mechanism of FIG. 2;

DETAILED DESCRIPTION OF PREFERRED EMBODIMENTS

Figure 1:
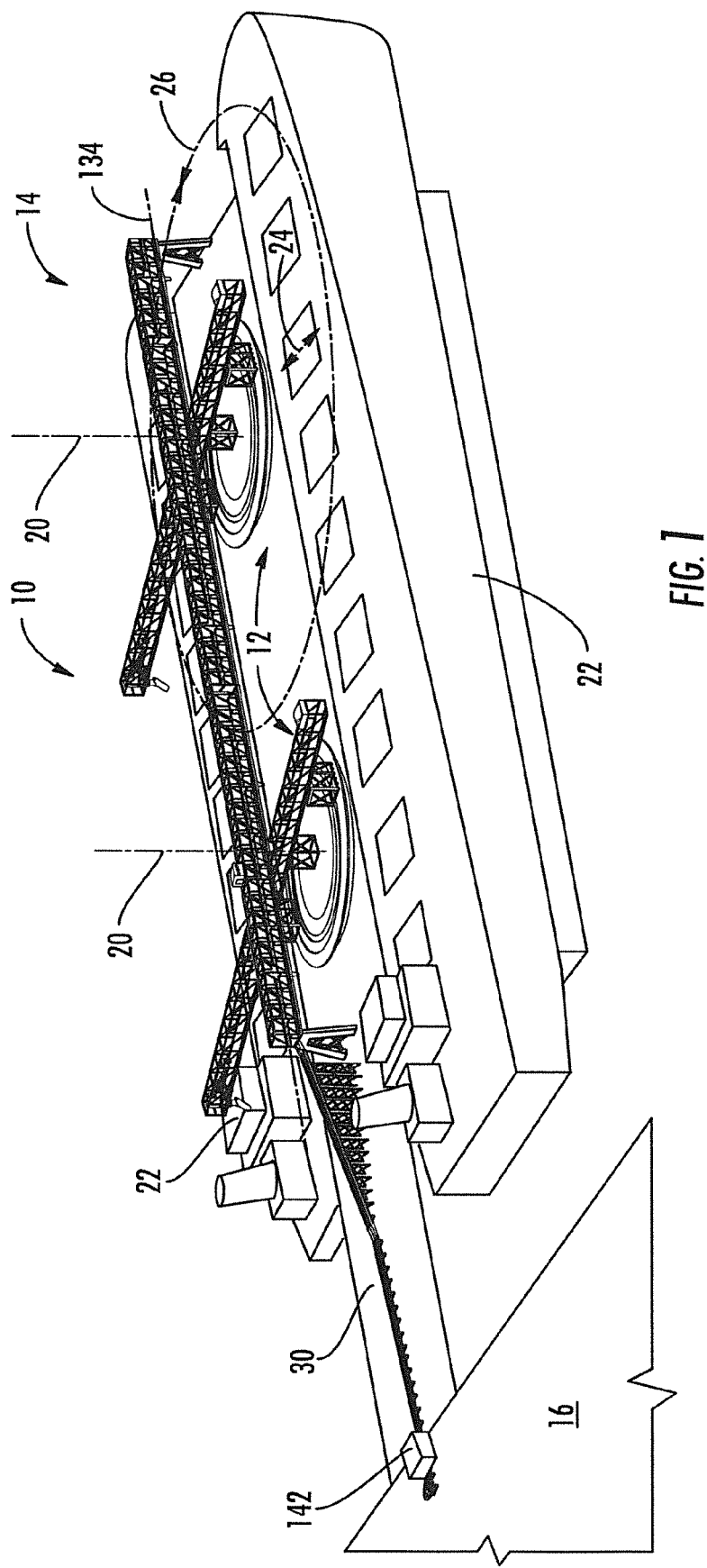
FIG. 1 is a perspective view of a bulk material handling system including a plurality of loading boom assemblies and a loading boom supply bridge assembly, according to an embodiment of the present invention.

Referring to FIG. 1, according to an embodiment of the present invention, a bulk material handling system 10 includes a plurality of loading boom assemblies 12 and a loading boom supply bridge assembly 14. Via the loading boom supply bridge assembly 14 bulk materials are transported from a bulk material supply point 16 to the loading boom assemblies 12. The loading boom assemblies 12 receive the bulk materials along respective loading axes 20 and discharge the bulk materials to bulk material destinations 22. As will be explained in greater detail below, the loading boom assemblies 12 are operable to vary their discharge points relative to their loading axes 20—most preferably both radially (arrow 24) and angularly (arrow 26).

In the depicted embodiment, the bulk material destinations 22 are ships, such that the bulk material handling system 10 functions as an efficient and flexible ship loading system; however, it will be appreciated that the present invention could be applied in other bulk material handling applications. Within the context of a ship loading application, the bulk material loading system 10 could advantageously by supported on a floating, movable pier 30 to facilitate relocation to other bulk material supply points.

Referring to FIGS. 2 and 3, an exemplary one of the loading boom assemblies 12 is shown, as the loading boom assemblies 12 are substantially identical. In the context of the claims appended hereto, "substantially identical" means that the loading boom assemblies each include all the recited elements; they are not necessarily identical with respect to elements not expressly recited by the claims, nor with respect to unspecified characteristics of recited elements, such as dimensions.

The loading boom assembly 12 includes a horizontal boom frame 32, a vertical boom frame 34, a boom frame rotation mechanism 36, a boom conveyor mechanism 40, a boom conveyor displacement mechanism 42, a receiving hopper 44, a discharge spout 46, and a counterweight mechanism 50. The vertical boom frame 34 supports the horizontal boom frame 32. The boom frame rotation mechanism 36 engages the vertical boom frame 34 to rotate it along with the horizontal boom frame, thereby effecting angular displacement of the discharge spout 46 about the loading/rotation axis 20.

The boom conveyor mechanism 40 is slidably mounted to the horizontal boom frame 32, intersecting the rotation axis 20 so as to always be positioned to receive bulk materials from the receiving hopper 44 and operable to convey the same to the discharge spout 46. To vary the radial placement of the discharge spout 46 relative to the rotation axis 20, the boom conveyor displacement mechanism 42 engages to the boom conveyor mechanism 40 and advances and withdraws the entire conveyor mechanism 40, along with the discharge spout 46 along the axis 48 of the horizontal boom 32. A counterweight mechanism 50 helps keep the loading boom assembly 10 balanced by advancing and withdrawing from the rotational axis 20 in the opposite direction of the boom conveyor mechanism 40. In FIG. 2, the boom conveyor mechanism 40 is fully advanced in a first direction, and in FIG. 3, fully withdrawn in a second direction, with the counterweight mechanism 50 fully advanced and withdrawn in opposition thereto.

The horizontal boom frame 32 is preferably constructed of a lattice of frame elements, made of steel or other metal with suitable strength, weight and corrosion-resistance properties for the environment in which it is to be employed. The horizontal boom frame 32 extends along the boom axis 48 between first and second boom frame ends 52, 54 and affords an unobstructed path for the boom conveyor mechanism 40 to slide along the boom axis 48 and through which to convey bulk materials.

The vertical boom frame 34 preferably includes first, second and third vertical sections 60, 62, 64 extending downwardly from the horizontal boom frame 32. The first and second vertical boom frame sections 60, 62 are equidistant from the rotation axis 20 and ride along an annular track 66. With bulk materials being conveyed from the rotation axis 20 toward the first boom end 52, the first vertical boom frame section 60 will ordinarily experience compressive forces and the second vertical boom frame section 62 will ordinarily experience tensile forces. Thus, the first section 60 will be urged into contact with the upper surface of the annular track 66 and can be supported for rolling movement on top thereof, whereas the second section 62 will be urged out of contact with the upper surface of the track 66, and can advantageously engage an underside thereof. The third vertical section 64 extends along the rotation axis 20 and is rotatably mounted to the ground or other underlying surface. Depending on the expected system loading, one or more of the vertical boom frame sections could be omitted, or additional sections could be used.

The boom frame rotation mechanism 36 engages the vertical boom frame 34 in order to impart rotational motion about the loading/rotation axis 20. In one embodiment, the boom frame rotation mechanism 36 includes a bull gear attached to a lower end of the third vertical boom frame section 64, which would, itself, by driven by a motor-driven gear. Alternately, a boom frame rotation mechanism 36A includes one or more motor-driven wheels attached to the first vertical boom frame section 60.

The boom conveyor mechanism 40 extends along the boom axis between first and second boom conveyor ends 70, 72, and is operable to convey bulk materials between the receiving hopper 44 and the discharge spout 46. A variety of conveyor mechanisms 40 could be employed in connection with embodiments of the present invention, but, referring more particularly to FIGS. 4 and 5, a most preferred embodiment includes rails 74 extending between the first and second conveyor ends 70, 72 on which a plurality of interconnected rail cars 76 ride. The rails 74 are slidably mounted to the horizontal beam frame 32 by a plurality of rollers 80.

Figure 6:
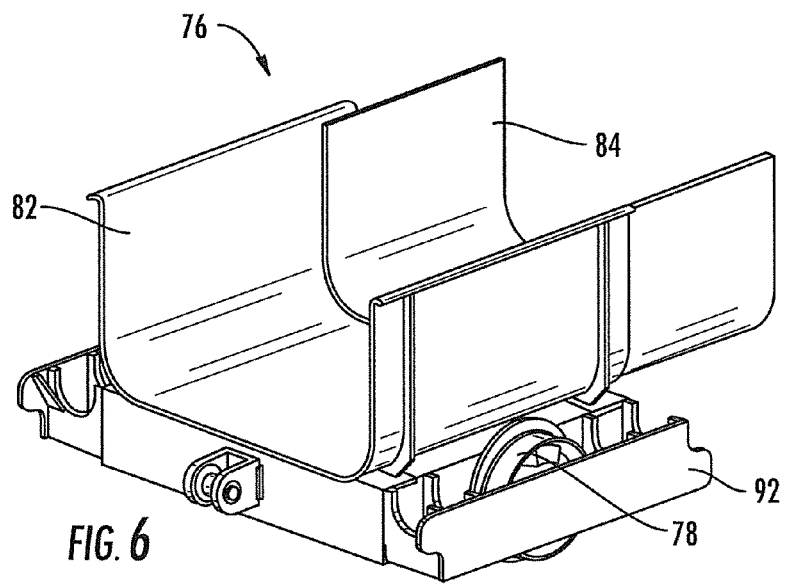
FIG. 6 is a perspective view an exemplary rail car used in the boom conveyor mechanism of FIG. 2.
Figure 7:
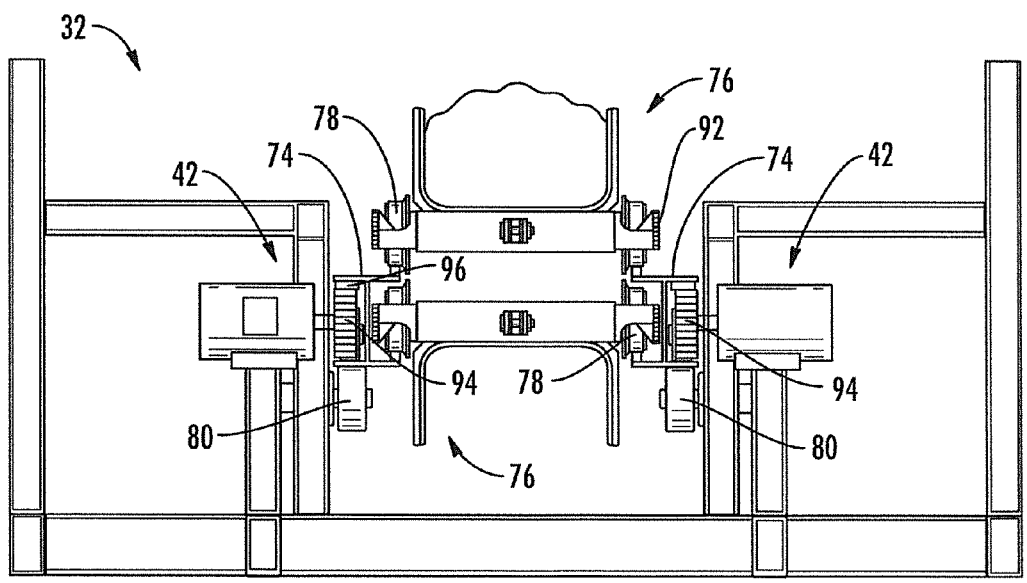
FIG. 7 is a sectional view of loading boom assembly of FIG. 2, including a boom conveyor displacement mechanism.

Referring to FIGS. 6 and 7, the rails 74 and rail cars 76 interact such that the rail cars 76 can ride on the rails 74 via wheels 78 both right-side and upside down. Wide flange I-beams are particularly suitable for the rails 74, with loop sections at the end to allow the transition between right-side up and upside down operation, as well as to enable bulk material dumping into the discharge spout 46 at the first boom conveyor end 70. Each rail car 76 includes a trough section 82 and a flexible flap 84 that will engage the trough section 82 of the car in front of it. Thus, a series of right-side up cars 76 will form a substantially continuous trough for the conveyance of bulk materials, as seen in FIGS. 4 and 5. For clarity of illustration, only a limited number of rail cars 76 are shown, but there are preferably sufficient rail cars 76 to form a continuous loop of rail cars across the top and bottom of the rails 74.

Referring to FIGS. 5 and 6, the rail cars 76 are driven by a boom conveyor driving mechanism 86. Advantageously, the conveyor driving mechanism 86 includes at least one drive wheel station, with motor-driven drive wheels 90. The drive wheels 90 engage side plates 92 on each of the cars 76 to impart motion thereto. The conveyor driving mechanism 86 is preferably mounted directly to the horizontal boom frame 32 between the rotation axis 20 and the second boom end 54, but close enough to the rotation axis 20 that the mechanism 86 will always be able to engage the continuous loop of rail cars 76. The conveyor driving mechanism 86 also offers additional counterweight in this location.

Figure 8:
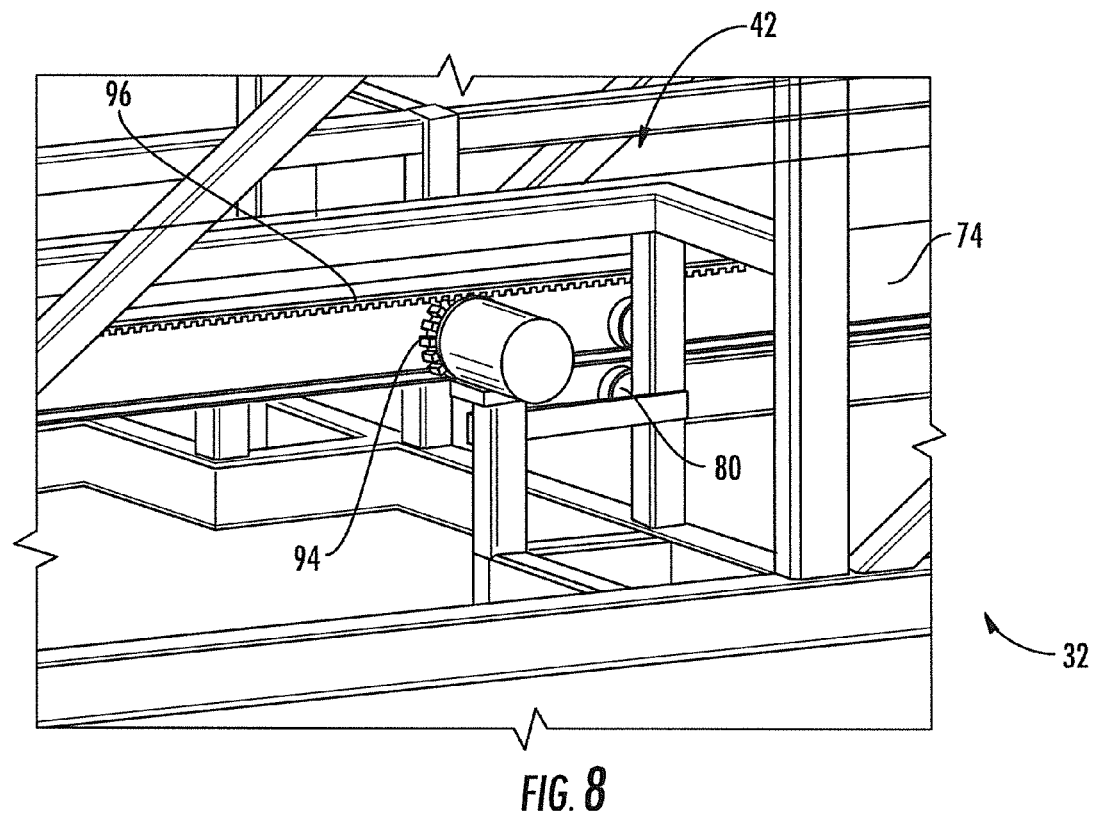
FIG. 8 is a detailed perspective view of area 8 of FIG. 2, including the boom conveyor displacement mechanism of FIG. 7.

Referring to FIGS. 7 and 8, the boom conveyor displacement mechanism 42 advantageously includes motor-drive pinions 94 that engage racks 96 on the rails 74 of the boom conveyor mechanism 40. Through operation of the pinions 94, the boom conveyor mechanism 40 is advanced in the first direction and withdrawn in the second direction. Referring to FIGS. 2 and 3, the advancement of the first boom conveyor end 70 is preferably limited to the first boom end 52. As the first conveyor end 70 moves away from the rotation axis 20, the second conveyor end 72 moves toward the rotation axis 20, and the opposite happens during withdrawal in the second direction. Thus, a portion of boom conveyor mechanism 40 is always retained underneath the receiving hopper 44.

Referring to FIG. 4, the discharge spout 46 includes a shroud 100, a spout end 102 and a dust collector 104, all of which are commonly mounted to the boom conveyor mechanism 40 first end 70 and move therewith. The shroud 100 surrounds the first conveyor end 70 and helps redirect the bulk material released from the rail cars 76 to the spout end 102, and also contains dust released therefrom. Advantageously, the shroud 100 can have a soft flexible lining. The released dust is collected by the dust collector 104 (e.g., a shaker bag collection system), which draws a suction on the shroud 100.

The spout end 102 further enhances the discharge placement flexibility of the loading boom assembly 12. More particularly, the spout end 102 is rotatable about discharge axis 106 via a collar 110 and pivotable via a joint 112 perpendicular to the discharge axis. By variably pivoting and rotating the spout end 102, a horizontal bulk material deflection distance and direction are varied.

Referring again to FIGS. 2 and 3, the counterweight mechanism 50 includes a counterweight 120 riding on rails 122 located on top of the horizontal boom frame 32. Preferably, the counterweight mechanism 50 is also driven by the boom conveyor displacement mechanism 42, such that advancement of the boom conveyor mechanism 40 automatically results in a compensating advancement, albeit at a reduced rate accounting to a reduced travel distance, of the counterweight 120. In general, the counterweight mechanism 50 should be dimensioned such that the center of gravity of the loading boom assembly 12 remains within the circle described by the first and second vertical frame sections 60, 62.

Figure 9:
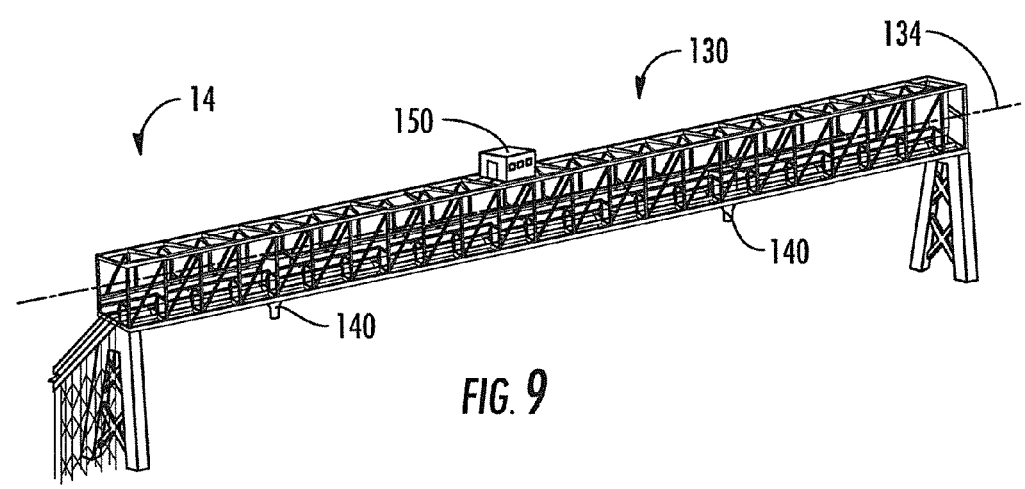
FIG. 9 is a perspective view of an elevated bridge frame of the loading boom supply bridge assembly of FIG. 1.
Figure 10:
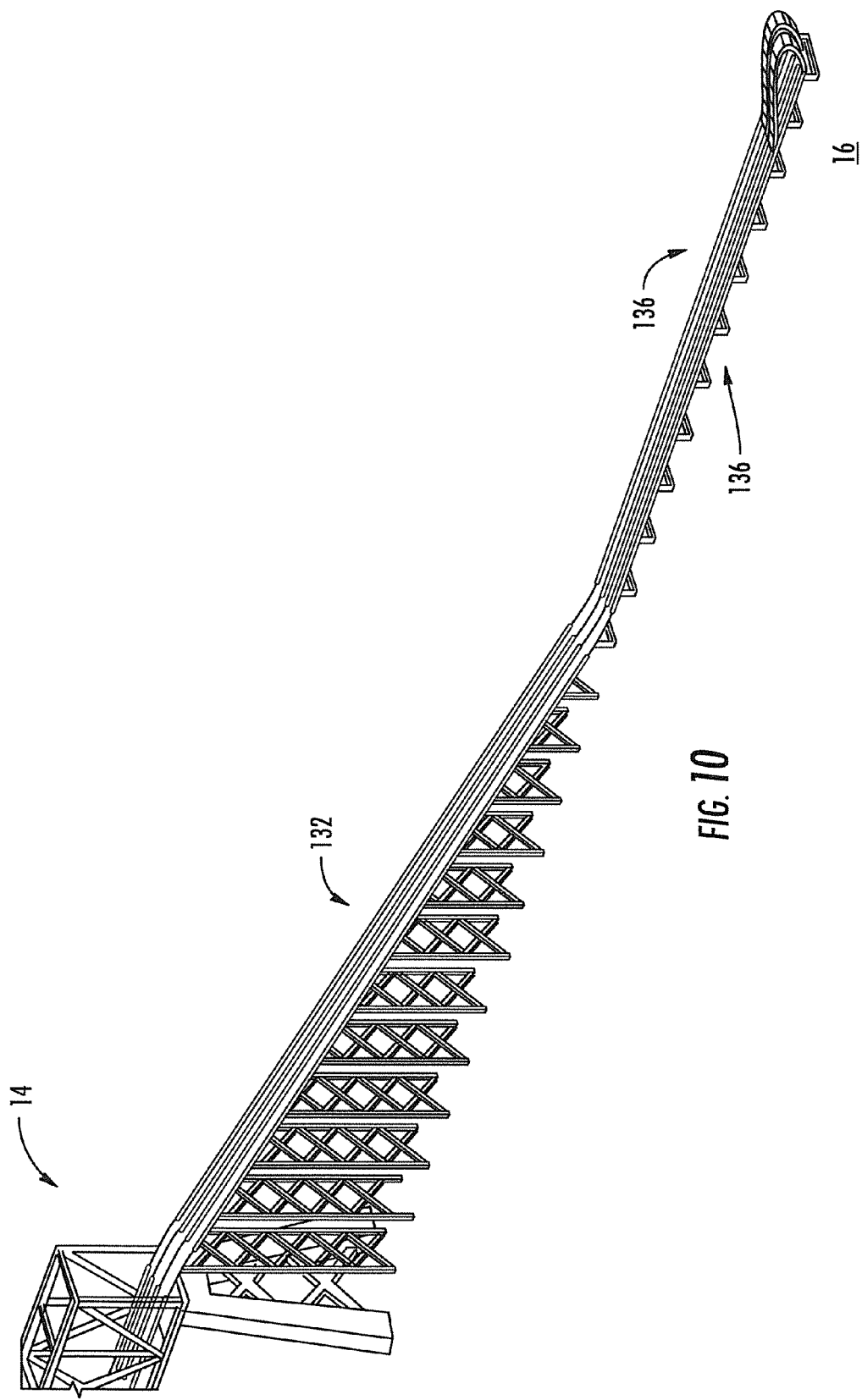
FIG. 10 is a perspective view of a bridge ramp frame of the loading boom supply bridge assembly of FIG. 1.

Referring to FIGS. 9 and 10, the loading boom supply bridge assembly 14 includes a elevated bridge frame 130 and a ramp frame 132 which extend generally in the direction of a bridge axis 134. The bridge axis 134 intersects the loading axis 20 of each of the loading boom assemblies 12 (see FIG. 1). A plurality of bridge conveyor mechanisms 136 carried by the frames 130 and 132 carry bulk material between the supply point 16 and a corresponding plurality of discharge chutes 140, one of which chutes 140 overlies a corresponding receiving hopper 44 of the loading boom assemblies 12. A split hopper 142 at the supply point 16 can evenly divide bulk material for supply to each of the bridge conveyor mechanisms 136.

Advantageously, the bridge conveyor mechanisms 136 are each substantially similar to the boom conveyor mechanisms 40, with a continuous loop of interconnected railcars travelling on rails right-side up and upside down, shrouds, and the like. To ensure synchronized operation, the bridge conveyor mechanisms 136 and boom conveyor mechanisms 40 can be powered by a common variable frequency drive (VFD). Additionally, bulk materials can be brought to the supply point 16 by one or more additional conveyor mechanisms like the above-described conveyor mechanisms 40, 136. A control house 150 for overseeing all bulk handling system 10 operations can be arranged on top of the elevated bridge frame 130.

In operation, and with particular reference to a ship loading example, bulk materials are brought to the supply point 16. Ships 22 are docked on either side of a supply pier 30. The loading boom assemblies 12 are rotated about their respective loading/rotation axes 20, with boom conveyor mechanisms 40 advanced/withdrawn, as necessary, such that one of them is positioned to begin loading a forward end of one of the ships 22, and the other one the aft end of the other ship 22. It will be appreciated that both loading boom assemblies 12 could also be employed simultaneously on a single ship 22.

Via the split hopper 142 bulk materials are loaded onto the bridge conveyor mechanisms 136 and conveyed to the discharge chutes 140. The bulk materials are received from the discharge chutes 140 into the receiving hoppers 40 and from thence to the boom conveyor mechanisms 40. The bulk materials are transported along the boom conveyor mechanisms 40 to the discharge spouts 46 and discharged into the ships 22.

Without having to interrupt the supply of bulk materials the discharge spout 46 is repositioned to alter the placement thereof (although bulk materials supply interruptions could be employed, if needed for other reasons—e.g., transit of the discharge spout 46 over an area where no bulk materials are to be deposited). Repositioning is accomplished with any desired combination of discharge spout 46 spout end 102 movements, translation of the boom conveyor mechanisms 40 and rotation of the loading boom assemblies 12. Once half of each ship 22 is filled, the loading boom assemblies 12 are each rotated in turn to fill the opposite end of the other ship 22, and the preceding process is repeated until both ships 22 are completely loaded.

From the foregoing, it will be appreciated that the present invention allows not only for fast transport of bulk materials between supply and destination, but through the flexible positioning afforded thereby, also minimizes or eliminates downtime during the loading process. Thus, a higher overall capacity throughput could be achieved relative to a less flexible system, or the same capacity could be achieved with a smaller cross-sectional area of carried material being required.

The foregoing examples are provided for illustrative and exemplary purposes; the present invention is not necessarily limited thereto. Rather, those skilled in the art will be appreciate that the variation modifications, as well as adaptations for particular circumstances, will fall within the scope of the invention herein shown and described, and of the claims appended hereto.

What is claimed is:

1. A bulk material handling system comprising:
 a first loading boom assembly including:
  a horizontal boom frame extending along a boom axis between first and second boom frame ends;
  a vertical boom frame supporting the horizontal boom frame between the first and second boom frame ends;
  a boom frame rotation mechanism engaging the vertical boom frame and operable to rotate the vertical and horizontal boom frames about a vertically-extending boom rotation axis intersecting the boom axis between the first and second boom frame ends;

a boom conveyor mechanism extending between first and second boom conveyor ends, the boom conveyor being slidably mounted to the horizontal boom frame extending along the boom axis and intersecting the rotation axis with the first boom conveyor end oriented toward the first boom frame end and the second boom conveyor end oriented toward the second boom frame end, the boom conveyor being operable to convey bulk material therealong;

a boom conveyor displacement mechanism engaging the boom conveyor mechanism and operable to slide the boom conveyor mechanism along the boom axis in a first boom direction, where the first and second boom conveyor ends move, respectively, away from and toward the rotation axis, and a second boom direction opposite thereto;

a receiving hopper mounted to the horizontal boom frame over the boom conveyor mechanism, the receiving hopper extending along the rotation axis and being configured to receive bulk material and subsequently direct bulk material to the boom conveyor mechanism; and a discharge spout arranged at the first end of the boom conveyor and slidable therewith, the discharge spout being configured to receive bulk material from the boom conveyor and subsequently discharge bulk material.

2. The bulk material handling system of claim 1, further comprising a loading boom supply bridge assembly including:

an elevated bridge frame extending over the first loading boom assembly along a bridge axis intersecting the rotation axis of the first loading boom assembly;

a first bridge discharge chute connected to the elevated bridge frame over the receiving hopper of the first loading boom assembly and operable to discharge bulk material thereinto; and a first bridge conveyor mechanism extending along the elevated bridge frame to the first bridge discharge chute and operable to convey bulk material from a supply point to the first bridge discharge chute.

3. The bulk material handling system of claim 2, further comprising a second loading boom assembly substantially identical to the first loading boom assembly and located adjacent thereto;

wherein the elevated bridge frame also extends over the second loading boom assembly, the bridge axis also intersects the rotation axis of the second loading boom assembly, and the loading boom supply assembly bridge further includes:

a second bridge discharge chute connected to the elevated bridge frame over the receiving hopper of the second loading boom assembly and operable to discharge bulk material thereinto; and a second bridge conveyor mechanism extending along the elevated bridge frame to the second bridge discharge chute and operable to convey bulk material from the loading point to the second bridge discharge chute.

4. The bulk material handling system of claim 1, wherein the vertical boom frame comprises first and second vertical boom frame sections extending downwardly from separate points on the horizontal boom frame equidistant from the rotation axis, and the first loading boom assembly further includes an annular track coaxial with the rotation axis on which the first and second vertical boom frame sections ride.

5. The bulk material handling system of claim 1, wherein the vertical boom frame further comprises a third vertical boom frame section extending downwardly from the horizontal boom frame along the rotation axis.

6. The bulk material handling system of claim 1, wherein the boom frame rotation mechanism includes a bull gear attached to the vertical boom frame coaxial with the rotation axis.

7. The bulk material handling system of claim 1, wherein the boom frame rotation mechanism includes at least one drive wheel attached to the boom frame.

8. The bulk material handling system of claim 1, wherein the boom conveyor mechanism includes:

rails extending between the first and second boom conveyor ends; and a plurality of connected rail cars riding on the rails; and a boom conveyor driving mechanism for driving the plurality of rail cars.

9. The bulk material handling system of claim 8, wherein the rails form a continuous loop between the first and second boom conveyor ends and the plurality of connected rail cars are adapted to ride toward the first boom conveyor end right-side up and to ride away from the first boom conveyor end suspended upside down.

10. The bulk material handling system of claim 9, wherein the plurality of connected rail cars are substantially continuous around the continuous loop.

11. The bulk material handling system of claim 10, wherein a plurality of flaps extend between the plurality of connected rail cars so as to form an uninterrupted trough for bulk material when riding right side up.

12. The bulk material handling system of claim 8, wherein the boom conveyor driving mechanism includes at least one drive wheel station engaging side plates of the plurality of rail cars.

13. The bulk material handling system of claim 1, wherein the boom conveyor mechanism includes a rack extending along the boom axis and the boom conveyor displacement mechanism includes a pinion engaging the rack for driving the boom conveyor mechanism in the first and second boom directions.

14. The bulk material handling system of claim 1, wherein, with the boom conveyor mechanism driven to a first direction movement limit, the first boom conveyor end is proximate to the first boom frame end, and with the boom conveyor mechanism driven to a second direction movement limit, the second boom conveyor end is proximate to the second boom frame end.

15. The bulk material handling system of claim 1, wherein the first loading boom assembly further includes a counterweight mechanism, the counterweight mechanism including a counterweight mounted to the horizontal boom frame and slidable along the boom axis between the rotation axis and the second boom frame end, the counterweight mechanism being operationally connected to the boom conveyor mechanism such that movement of the boom conveyor mechanism in the first direction results in movement of the counterweight toward the second boom frame end and movement of the boom conveyor mechanism in the second direction results in movement of the counterweight toward the rotation axis.

16. The bulk material handling system of claim 1, wherein the discharge spout includes a discharge spout end that is pivotable to vary a horizontal deflection distance of bulk material away from a vertical discharge axis.

17. The bulk material handling system of claim 16, wherein the discharge spout end is also rotatable about the vertical discharge axis to vary a deflection direction of bulk material.

18. The bulk material handling system of claim 1, wherein the discharge spout includes a shroud.

19. The bulk material handling system of claim 1, wherein the discharge spout further includes a dust collector drawing a suction on the shroud.

20. The bulk material handling system of claim 1, wherein the boom frame rotation mechanism, the boom conveyor mechanism and the boom conveyor displacement mechanism are operable simultaneously to alter the position of the discharge spout without interrupting a flow of bulk materials through the system.

21. A bulk material handling system comprising:
   a first loading boom assembly including:
      a horizontal boom frame extending along a boom axis between first and second boom frame ends;
      a boom conveyor mechanism extending between first and second boom conveyor ends, the boom conveyor being slidably mounted to the horizontal boom frame extending along the boom axis with the first boom conveyor end oriented toward the first boom frame end and the second boom conveyor end oriented toward the second boom frame end, the boom conveyor mechanism being operable to convey bulk material therealong;
      a receiving hopper mounted to the horizontal boom frame over the boom conveyor mechanism, the receiving hopper extending along a loading axis and being configured to receive bulk material and subsequently direct bulk material to the boom conveyor mechanism;
      a discharge spout arranged at the first end of the boom conveyor and slidable therewith, the discharge spout being configured to receive bulk material from the boom conveyor and subsequently discharge bulk material; and
   a boom conveyor displacement mechanism engaging the boom conveyor mechanism and operable to slide the boom conveyor mechanism along the boom axis in a first boom direction, where the first and second boom conveyor ends move, respectively, away from and toward the loading axis, and a second boom direction opposite thereto.

\* \* \* \* \*